(12) United States Patent
Justusson et al.

(10) Patent No.: US 8,391,884 B2
(45) Date of Patent: *Mar. 5, 2013

(54) SYSTEM AND METHOD FOR MANAGING CREATED LOCATION CONTEXTS IN A LOCATION SERVER

(75) Inventors: Gary Neil Justusson, Figtree (AU); Anthony James Winterbottom, Gwynneville (AU)

(73) Assignee: Andrew LLC, Hickory, NC (US)

( * ) Notice: Subject to any disclaimer, the term of this patent is extended or adjusted under 35 U.S.C. 154(b) by 619 days.

This patent is subject to a terminal disclaimer.

(21) Appl. No.: 12/411,928

(22) Filed: Mar. 26, 2009

(65) Prior Publication Data

US 2010/0248740 A1 Sep. 30, 2010

(51) Int. Cl.
*H04L 12/66* (2006.01)
*H04L 9/00* (2006.01)
*G06F 7/00* (2006.01)

(52) U.S. Cl. ........... 455/456.1; 370/352; 380/277; 707/770

(58) Field of Classification Search .... 455/414.1–414.4, 455/404.1–404.2, 575.1–575.9, 456.5, 422, 455/456.1–457, 410–411; 379/37–51, 157, 379/158, 201, 203.01, 212.01–216.01, 142.01, 379/142.04–142.05; 370/259–271, 328–338
See application file for complete search history.

(56) References Cited

U.S. PATENT DOCUMENTS

| | | | |
|---|---|---|---|
| 3,150,372 A | 9/1964 | Groth, Jr. | |
| 3,659,085 A | 4/1972 | Potter et al. | |
| 4,728,959 A | 3/1988 | Maloney | |
| 4,814,751 A | 3/1989 | Hawkins | |

(Continued)

FOREIGN PATENT DOCUMENTS

| | | |
|---|---|---|
| EP | 2 034 793 A1 | 3/2009 |
| JP | 06-347529 | 12/1994 |
| WO | 2006088472 A1 | 8/2006 |

OTHER PUBLICATIONS

M. Barnes et al.; "HTTP Enabled Location Delivery (HELD)" Internet Engineering Task Force; Switzerland; vol. geopriv, No. 13; Feb. 25, 2009; pp. 4-32.

(Continued)

*Primary Examiner* — Dwayne Bost
*Assistant Examiner* — Scott Trandai
(74) *Attorney, Agent, or Firm* — Duane Morris LLP

(57) ABSTRACT

A system and method for handling a location request for a target device using a location uniform resource identifier ("URI"). A location request may be received for a target device from a requesting entity, the target device having a location context information represented by a location URI and including starting information, initial validating information and policy information. The form of the location URI may be verified by a location information server ("LIS"), the form including at least an encrypted context string. This string may be extracted and decrypted by the LIS and it may be determined whether the request can continue as a function of the policy information. If the request can continue, then an estimated location of the target device may be determined as a function of the starting information. Additional validating information may be collected and correlated the initial validating information. If these validating information correlate, then the estimated location of the target device may be provided to the requesting entity.

24 Claims, 6 Drawing Sheets

U.S. PATENT DOCUMENTS

| | | | |
|---|---|---|---|
| 4,845,504 A | 7/1989 | Roberts et al. | |
| 4,891,650 A | 1/1990 | Sheffer | |
| 5,056,106 A | 10/1991 | Wang | |
| 5,218,618 A | 6/1993 | Sagey | |
| 5,317,323 A | 5/1994 | Kennedy et al. | |
| 5,327,144 A | 7/1994 | Stilp et al. | |
| 5,365,544 A | 11/1994 | Schilling | |
| 5,372,144 A | 12/1994 | Mortier et al. | |
| 5,404,376 A | 4/1995 | Dent | |
| 5,423,067 A | 6/1995 | Manabe | |
| 5,465,289 A | 11/1995 | Kennedy | |
| 5,506,863 A | 4/1996 | Meidan et al. | |
| 5,506,864 A | 4/1996 | Schilling | |
| 5,508,708 A | 4/1996 | Ghosh et al. | |
| 5,512,908 A | 4/1996 | Herrick | |
| 5,515,419 A | 5/1996 | Sheffer | |
| 5,519,760 A | 5/1996 | Borkowski et al. | |
| 5,559,864 A | 9/1996 | Kennedy | |
| 5,592,180 A | 1/1997 | Yokev et al. | |
| 5,608,410 A | 3/1997 | Stilp et al. | |
| 5,614,914 A | 3/1997 | Bolgiano et al. | |
| 5,675,344 A | 10/1997 | Tong et al. | |
| 5,736,964 A | 4/1998 | Ghosh et al. | |
| 5,815,538 A | 9/1998 | Grell et al. | |
| 5,825,887 A | 10/1998 | Lennen | |
| 5,862,325 A * | 1/1999 | Reed et al. | 709/201 |
| 5,870,029 A | 2/1999 | Otto et al. | |
| 5,920,278 A | 7/1999 | Tyler et al. | |
| 5,952,969 A | 9/1999 | Hagerman et al. | |
| 5,959,580 A | 9/1999 | Maloney et al. | |
| 5,960,341 A | 9/1999 | LeBlanc et al. | |
| 5,973,643 A | 10/1999 | Hawkes et al. | |
| 5,987,329 A | 11/1999 | Yost | |
| 5,987,464 A * | 11/1999 | Schneider | 707/999.01 |
| 6,014,102 A | 1/2000 | Mitzlaff et al. | |
| 6,047,192 A | 4/2000 | Maloney | |
| 6,088,717 A * | 7/2000 | Reed et al. | 709/201 |
| 6,091,362 A | 7/2000 | Stilp | |
| 6,097,336 A | 8/2000 | Stilp | |
| 6,097,709 A | 8/2000 | Kuwabara | |
| 6,097,959 A | 8/2000 | Yost | |
| 6,101,178 A | 8/2000 | Beal | |
| 6,108,555 A | 8/2000 | Maloney et al. | |
| 6,108,558 A | 8/2000 | Vanderspool, II | |
| 6,115,599 A | 9/2000 | Stilp | |
| 6,115,605 A | 9/2000 | Siccardo et al. | |
| 6,115,754 A * | 9/2000 | Landgren | 709/249 |
| 6,119,013 A | 9/2000 | Maloney et al. | |
| 6,127,975 A | 10/2000 | Maloney | |
| 6,144,711 A | 11/2000 | Raleigh et al. | |
| 6,172,644 B1 | 1/2001 | Stilp | |
| 6,184,829 B1 | 2/2001 | Stilp | |
| 6,188,351 B1 | 2/2001 | Bloebaum | |
| 6,191,738 B1 | 2/2001 | Pfeil et al. | |
| 6,201,499 B1 | 3/2001 | Hawkes et al. | |
| 6,201,803 B1 | 3/2001 | Munday et al. | |
| 6,212,319 B1 | 4/2001 | Cayrefourcq | |
| 6,233,459 B1 | 5/2001 | Sullivan et al. | |
| 6,246,884 B1 | 6/2001 | Karmi et al. | |
| 6,266,013 B1 | 7/2001 | Stilp et al. | |
| 6,269,246 B1 | 7/2001 | Rao et al. | |
| 6,281,834 B1 | 8/2001 | Stilp | |
| 6,285,321 B1 | 9/2001 | Stilp et al. | |
| 6,288,675 B1 | 9/2001 | Maloney | |
| 6,288,676 B1 | 9/2001 | Maloney | |
| 6,295,455 B1 | 9/2001 | Fischer et al. | |
| 6,311,043 B1 | 10/2001 | Haardt et al. | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |
| 6,345,288 B1 * | 2/2002 | Reed et al. | 709/201 |
| 6,351,235 B1 | 2/2002 | Stilp | |
| 6,366,241 B2 | 4/2002 | Pack | |
| 6,388,618 B1 | 5/2002 | Stilp et al. | |
| 6,393,294 B1 | 5/2002 | Perez-Breva et al. | |
| 6,400,320 B1 | 6/2002 | Stilp et al. | |
| 6,407,703 B1 | 6/2002 | Minter et al. | |
| 6,449,486 B1 | 9/2002 | Rao | |
| 6,463,290 B1 | 10/2002 | Stilp et al. | |
| 6,470,195 B1 | 10/2002 | Meyer | |
| 6,477,161 B1 | 11/2002 | Hudson | |
| 6,483,460 B2 | 11/2002 | Stilp et al. | |
| 6,492,944 B1 | 12/2002 | Stilp | |
| 6,501,955 B1 | 12/2002 | Durrant et al. | |
| 6,519,465 B2 | 2/2003 | Stilp et al. | |
| 6,546,256 B1 | 4/2003 | Maloney | |
| 6,553,322 B1 | 4/2003 | Ignagni | |
| 6,563,460 B2 | 5/2003 | Stilp et al. | |
| 6,571,082 B1 | 5/2003 | Rahman | |
| 6,591,112 B1 | 7/2003 | Siccardo et al. | |
| 6,594,483 B2 * | 7/2003 | Nykanen et al. | 455/411 |
| 6,603,428 B2 | 8/2003 | Stilp | |
| 6,603,761 B1 | 8/2003 | Wang | |
| 6,640,106 B2 * | 10/2003 | Gutowski et al. | 455/456.1 |
| 6,646,604 B2 | 11/2003 | Anderson | |
| 6,661,379 B2 | 12/2003 | Stilp et al. | |
| 6,757,710 B2 * | 6/2004 | Reed | 709/203 |
| 6,765,531 B2 | 7/2004 | Anderson | |
| 6,771,625 B1 | 8/2004 | Beal | |
| 6,771,969 B1 * | 8/2004 | Chinoy et al. | 455/456.1 |
| 6,782,264 B2 | 8/2004 | Anderson | |
| 6,782,265 B2 | 8/2004 | Perez-Breva et al. | |
| 6,813,503 B1 * | 11/2004 | Zillikens et al. | 455/457 |
| 6,834,234 B2 | 12/2004 | Scherzinger et al. | |
| 6,839,539 B2 | 1/2005 | Durrant et al. | |
| 6,845,240 B2 | 1/2005 | Carlson et al. | |
| 6,859,172 B2 | 2/2005 | Powers et al. | |
| 6,871,077 B2 | 3/2005 | Kennedy, Jr. | |
| 6,873,290 B2 | 3/2005 | Anderson et al. | |
| 6,876,859 B2 | 4/2005 | Anderson et al. | |
| 6,920,329 B2 | 7/2005 | Kennedy, Jr. et al. | |
| 6,922,170 B2 | 7/2005 | Alexander, Jr. | |
| 6,944,465 B2 | 9/2005 | Spain et al. | |
| 6,944,658 B1 * | 9/2005 | Schneider | 709/224 |
| 6,952,158 B2 | 10/2005 | Kennedy, Jr. | |
| 6,973,505 B1 * | 12/2005 | Schneider | 709/245 |
| 6,977,909 B2 * | 12/2005 | Minborg | 370/260 |
| 6,987,979 B2 | 1/2006 | Carlsson | |
| 6,996,392 B2 | 2/2006 | Anderson | |
| 7,010,568 B1 * | 3/2006 | Schneider et al. | 709/203 |
| 7,023,383 B2 | 4/2006 | Stilp et al. | |
| 7,103,369 B2 * | 9/2006 | Sato et al. | 455/456.3 |
| 7,113,794 B2 * | 9/2006 | Annamalai | 455/456.1 |
| 7,116,987 B2 | 10/2006 | Spain, Jr. et al. | |
| 7,136,932 B1 * | 11/2006 | Schneider | 709/245 |
| 7,167,713 B2 | 1/2007 | Anderson | |
| 7,167,714 B2 | 1/2007 | Dressler et al. | |
| 7,188,138 B1 * | 3/2007 | Schneider | 709/203 |
| 7,194,552 B1 * | 3/2007 | Schneider | 709/245 |
| 7,233,799 B2 | 6/2007 | Spain, Jr. | |
| 7,250,907 B2 | 7/2007 | Krumm et al. | |
| 7,257,414 B2 | 8/2007 | Spain, Jr. et al. | |
| 7,271,765 B2 | 9/2007 | Stilp et al. | |
| 7,340,259 B2 | 3/2008 | Maloney | |
| 7,383,051 B2 | 6/2008 | Spain, Jr. et al. | |
| 7,418,256 B2 * | 8/2008 | Kall et al. | 455/411 |
| 7,427,952 B2 | 9/2008 | Bull et al. | |
| 7,433,652 B2 | 10/2008 | Durgin | |
| 7,433,695 B2 | 10/2008 | Gordon et al. | |
| 7,440,762 B2 | 10/2008 | Maloney et al. | |
| 7,441,032 B2 * | 10/2008 | Costa Requena | 709/225 |
| 7,441,203 B2 * | 10/2008 | Othmer et al. | 715/774 |
| 7,460,505 B2 | 12/2008 | Spain | |
| 7,472,349 B1 * | 12/2008 | Srivastava et al. | 1/1 |
| 7,475,140 B2 * | 1/2009 | Requena | 709/225 |
| 7,532,895 B2 * | 5/2009 | Hrastar | 455/456.1 |
| 7,533,141 B2 * | 5/2009 | Nadgir et al. | 709/200 |
| 7,533,265 B2 * | 5/2009 | Ballinger et al. | 713/172 |
| 7,565,402 B2 * | 7/2009 | Schneider | 709/203 |
| 7,593,738 B2 | 9/2009 | Anderson | |
| 7,602,886 B1 * | 10/2009 | Beech et al. | 379/45 |
| 7,725,111 B2 | 5/2010 | Dressler et al. | |
| 7,734,298 B2 | 6/2010 | Bhattacharya et al. | |
| 7,753,278 B2 | 7/2010 | Spain, Jr. et al. | |
| 7,783,299 B2 * | 8/2010 | Anderson et al. | 455/456.1 |
| 7,796,966 B2 | 9/2010 | Bhattacharya et al. | |
| 7,814,060 B2 * | 10/2010 | Stoyanova | 707/661 |

| | | |
|---|---|---|
| 7,848,762 B2 | 12/2010 | Gordon et al. |
| 7,870,196 B2 * | 1/2011 | Costa Requena ............ 709/206 |
| 7,890,956 B2 * | 2/2011 | Angelov et al. ............... 719/313 |
| 7,899,467 B2 | 3/2011 | Feuerstein et al. |
| 7,916,071 B2 * | 3/2011 | Harper ..................... 342/357.31 |
| 7,925,717 B2 * | 4/2011 | Chou et al. ..................... 709/219 |
| 7,929,470 B2 * | 4/2011 | Minborg et al. .............. 370/300 |
| 7,937,067 B2 * | 5/2011 | Maier et al. ................. 455/404.1 |
| 7,970,389 B2 * | 6/2011 | Ramer et al. ................ 455/414.2 |
| 8,009,592 B2 * | 8/2011 | Minborg ........................ 370/260 |
| 8,013,785 B2 | 9/2011 | Bhattacharya et al. |
| 8,068,802 B2 | 11/2011 | Bhattacharya et al. |
| 8,068,855 B2 | 11/2011 | Dressler et al. |
| 8,106,817 B2 | 1/2012 | Bhattacharya et al. |
| 8,106,818 B2 | 1/2012 | Bhattacharya et al. |
| 8,127,005 B2 * | 2/2012 | Fernandez Gutierrez .... 709/224 |
| 8,155,394 B2 | 4/2012 | Allegra et al. |
| 2001/0055975 A1 * | 12/2001 | McDonnell et al. .......... 455/456 |
| 2002/0004399 A1 * | 1/2002 | McDonnell et al. .......... 455/456 |
| 2002/0095454 A1 * | 7/2002 | Reed et al. ..................... 709/201 |
| 2002/0095465 A1 * | 7/2002 | Banks et al. ................... 709/206 |
| 2002/0120685 A1 * | 8/2002 | Srivastava et al. ............ 709/203 |
| 2002/0160790 A1 * | 10/2002 | Schwartz et al. .............. 455/456 |
| 2002/0172223 A1 | 11/2002 | Stilp et al. |
| 2002/0177449 A1 * | 11/2002 | McDonnell et al. .......... 455/456 |
| 2003/0064734 A1 | 4/2003 | Stilp et al. |
| 2003/0139188 A1 | 7/2003 | Chen et al. |
| 2003/0190919 A1 | 10/2003 | Niemenmaa |
| 2003/0203738 A1 | 10/2003 | Brown et al. |
| 2004/0009777 A1 * | 1/2004 | Koskimies et al. ......... 455/456.1 |
| 2004/0029567 A1 * | 2/2004 | Timmins et al. ............ 455/412.1 |
| 2004/0043775 A1 | 3/2004 | Kennedy, Jr. et al. |
| 2004/0132466 A1 | 7/2004 | Kennedy, Jr. et al. |
| 2004/0185877 A1 * | 9/2004 | Asthana et al. ............. 455/456.6 |
| 2004/0193725 A1 * | 9/2004 | Costa-Requena et al. .... 709/238 |
| 2004/0202292 A1 * | 10/2004 | Cook ............................ 379/67.1 |
| 2004/0203539 A1 | 10/2004 | Benes et al. |
| 2004/0203582 A1 * | 10/2004 | Dorenbosch et al. ......... 455/406 |
| 2004/0203764 A1 * | 10/2004 | Hrastar et al. .............. 455/435.1 |
| 2004/0203869 A1 * | 10/2004 | Annamalai .................. 455/456.1 |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2004/0253965 A1 * | 12/2004 | Sato et al. .................. 455/456.3 |
| 2005/0004978 A1 * | 1/2005 | Reed et al. ..................... 709/203 |
| 2005/0058182 A1 | 3/2005 | Kennedy, Jr. et al. |
| 2005/0113123 A1 * | 5/2005 | Torvinen ........................ 455/519 |
| 2005/0120200 A1 * | 6/2005 | Brignone et al. .............. 713/154 |
| 2005/0136945 A1 | 6/2005 | Kennedy, Jr. et al. |
| 2005/0164712 A1 | 7/2005 | Kennedy, Jr. et al. |
| 2005/0192026 A1 | 9/2005 | Carlson et al. |
| 2005/0232189 A1 * | 10/2005 | Loushine ....................... 370/328 |
| 2006/0003695 A1 | 1/2006 | Kennedy, Jr. et al. |
| 2006/0003775 A1 * | 1/2006 | Bull et al. ................... 455/456.1 |
| 2006/0015728 A1 * | 1/2006 | Ballinger et al. .............. 713/172 |
| 2006/0030333 A1 | 2/2006 | Ward et al. |
| 2006/0089160 A1 * | 4/2006 | Othmer ......................... 455/457 |
| 2006/0116130 A1 | 6/2006 | Kennedy, Jr. et al. |
| 2006/0121913 A1 * | 6/2006 | Lin et al. .................... 455/456.1 |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kennedy, Jr. et al. |
| 2006/0165060 A1 * | 7/2006 | Dua .............................. 370/352 |
| 2006/0236382 A1 * | 10/2006 | Hinton et al. ..................... 726/8 |
| 2006/0240836 A1 | 10/2006 | Kennedy, Jr. et al. |
| 2007/0060097 A1 * | 3/2007 | Edge et al. ................. 455/404.1 |
| 2007/0060173 A1 * | 3/2007 | Ramer et al. ............... 455/456.3 |
| 2007/0061245 A1 * | 3/2007 | Ramer et al. ..................... 705/37 |
| 2007/0067461 A1 * | 3/2007 | Savchenko et al. ........... 709/227 |
| 2007/0067473 A1 * | 3/2007 | Baikov et al. ................. 709/230 |
| 2007/0067475 A1 * | 3/2007 | Videlov et al. ................ 709/230 |
| 2007/0067479 A1 * | 3/2007 | Angelov ........................ 709/231 |
| 2007/0067494 A1 * | 3/2007 | Savchenko et al. ........... 709/246 |
| 2007/0087689 A1 | 4/2007 | Kennedy, Jr. et al. |
| 2007/0099634 A1 * | 5/2007 | Chari et al. ................ 455/456.3 |
| 2007/0111746 A1 | 5/2007 | Anderson et al. |
| 2007/0150300 A1 * | 6/2007 | Fukazawa et al. ................ 705/1 |
| 2007/0150329 A1 * | 6/2007 | Brook et al. ...................... 705/8 |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2007/0270164 A1 * | 11/2007 | Maier et al. ................. 455/456.2 |
| 2007/0276907 A1 * | 11/2007 | Maes ............................ 709/204 |
| 2007/0288754 A1 * | 12/2007 | Kaji et al. ..................... 713/175 |
| 2008/0065775 A1 * | 3/2008 | Polk .............................. 709/228 |
| 2008/0080479 A1 * | 4/2008 | Maes ............................ 370/352 |
| 2008/0119204 A1 * | 5/2008 | Hines et al. ................. 455/456.2 |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0139210 A1 * | 6/2008 | Gisby et al. .................... 455/445 |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0176582 A1 * | 7/2008 | Ghai et al. .................. 455/456.2 |
| 2008/0212499 A1 * | 9/2008 | Maes ............................ 370/265 |
| 2008/0214166 A1 * | 9/2008 | Ramer et al. ............... 455/414.3 |
| 2008/0214204 A1 * | 9/2008 | Ramer et al. ............... 455/456.1 |
| 2008/0228654 A1 * | 9/2008 | Edge ............................... 705/71 |
| 2008/0242312 A1 * | 10/2008 | Paulson et al. ............. 455/456.1 |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |
| 2009/0131017 A1 * | 5/2009 | Osborn ......................... 455/411 |
| 2009/0222457 A1 * | 9/2009 | Gallant ........................... 707/10 |
| 2009/0280770 A1 * | 11/2009 | Mahendran ................ 455/404.1 |
| 2009/0280775 A1 * | 11/2009 | Moeglein et al. ............. 455/410 |
| 2009/0285204 A1 * | 11/2009 | Gallant et al. ................. 370/352 |
| 2009/0285393 A1 * | 11/2009 | Osthassel ...................... 380/255 |
| 2010/0003972 A1 * | 1/2010 | Little et al. .................... 455/418 |
| 2010/0029272 A1 * | 2/2010 | McCann et al. ............... 455/433 |
| 2010/0069092 A1 * | 3/2010 | Bajpai et al. ................ 455/456.3 |
| 2010/0077468 A1 * | 3/2010 | Pragides et al. ................... 726/7 |
| 2010/0138520 A1 * | 6/2010 | Gallant ......................... 709/220 |
| 2010/0156713 A1 * | 6/2010 | Harper ...................... 342/357.09 |
| 2010/0157848 A1 * | 6/2010 | Das et al. ...................... 370/254 |
| 2010/0180039 A1 * | 7/2010 | Oh et al. ....................... 709/228 |
| 2010/0188975 A1 * | 7/2010 | Raleigh ...................... 370/230.1 |
| 2010/0192212 A1 * | 7/2010 | Raleigh ............................ 726/7 |
| 2010/0234022 A1 * | 9/2010 | Winterbottom ............... 455/433 |
| 2010/0246780 A1 * | 9/2010 | Bakker et al. ................... 379/38 |
| 2010/0248740 A1 * | 9/2010 | Justusson et al. ........... 455/456.1 |
| 2010/0279652 A1 * | 11/2010 | Sharp et al. ................... 455/410 |
| 2010/0291907 A1 * | 11/2010 | MacNaughtan et al. ... 455/414.1 |
| 2010/0304759 A1 * | 12/2010 | Leppanen et al. .......... 455/456.2 |
| 2010/0332583 A1 * | 12/2010 | Szabo ........................... 709/202 |
| 2011/0004672 A1 * | 1/2011 | Garcia-Martin et al. ..... 709/220 |
| 2011/0105145 A1 * | 5/2011 | Chandrasekaran ......... 455/456.1 |
| 2011/0105146 A1 * | 5/2011 | Chandrasekaran ......... 455/456.1 |
| 2011/0151839 A1 * | 6/2011 | Bolon et al. ................ 455/414.1 |
| 2012/0020314 A1 * | 1/2012 | Osborn .......................... 370/329 |
| 2012/0028651 A1 * | 2/2012 | Hines et al. ................. 455/456.1 |

OTHER PUBLICATIONS

R. Marshall et al; "Requirements for a Location-by-Reference Mechanism"; Internet Engineering Task Force; Switzerland; vol. geopriv, No. 7; Feb. 26, 2009; pp. 4-14.

J. Winterbottom; "Held Protocol Context Management Extensions"; Internet Engineering Task Force; Switzerland; No. 3; Sep. 29, 2008; pp. 5-12.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

Y. Zhao, "Standardization of Mobile Phone Positioning for 3G Systems," IEEE Communications Magazine, Jul. 2002, pp. 108-116.

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex UK, 2001, pp. 1-41.

* cited by examiner

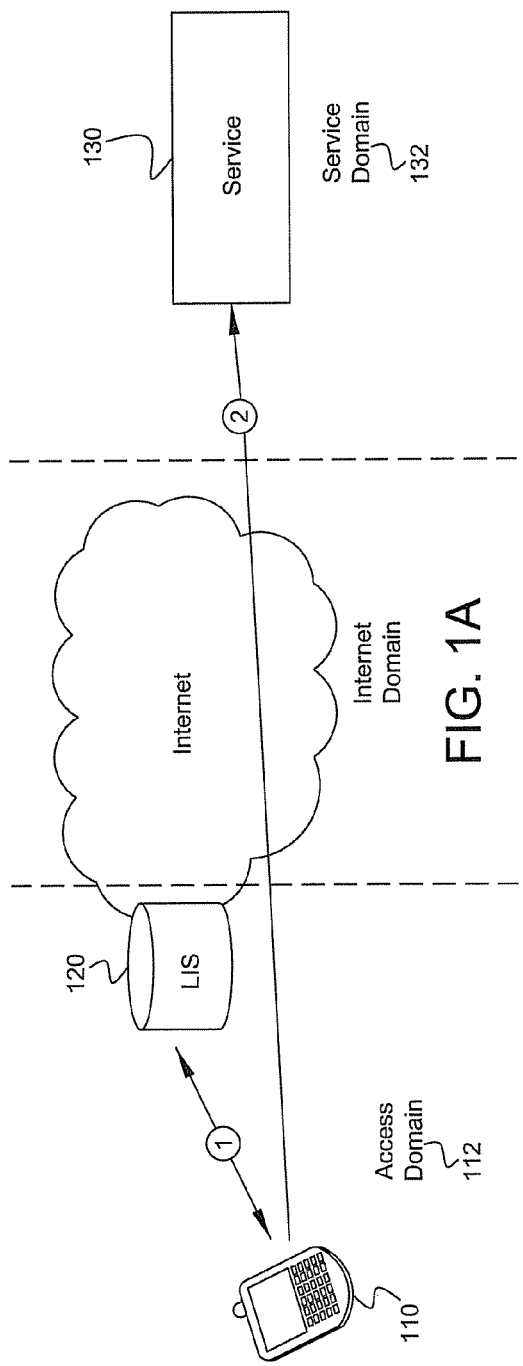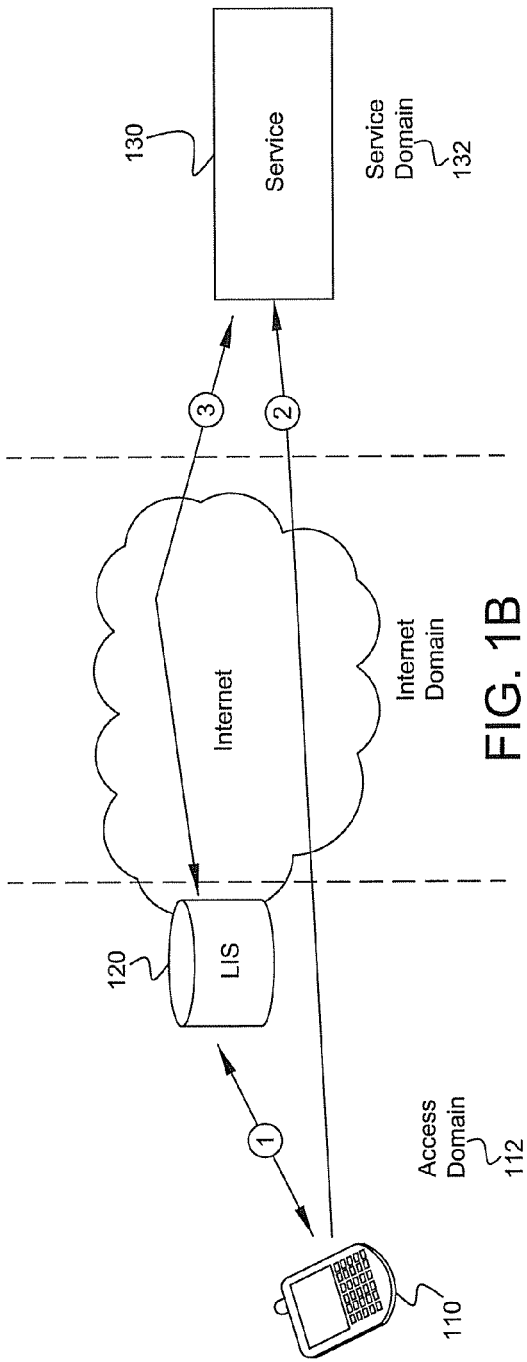

SYSTEM AND METHOD FOR MANAGING CREATED LOCATION CONTEXTS IN A LOCATION SERVER

RELATED APPLICATIONS

The instant application is related to and co-pending with U.S. application Ser. No. 12/411,883, entitled, "System and Method for Managing Created Location Contexts in a Location Server," filed Mar. 26, 2009, the entirety of which is incorporated herein by reference.

BACKGROUND

The location of a mobile, wireless or wired device is a useful and sometimes necessary part of many services. A Location Information Server ("LIS") may be responsible for providing location information to such devices with an access network. The LIS may utilize knowledge of the access network and its physical topology to generate and serve location information to devices.

The LIS, in general terms, is a network node originally defined in the National Emergency Number Association ("NENA") i2 network architecture addressing a solution for providing E-911 service for users of Voice over Internet Protocol ("VoIP") telephony. In VoIP networks, the LIS is the node that determines the location of the VoIP terminal. Beyond the NENA architecture and VoIP, the LIS is a service provided by an access network provider to supply location information to users of the network by utilizing knowledge of network topology and employing a range of location determination techniques to locate devices attached to the network. The precise methods used to determine location are generally dependent on the type of access network and the information that can be obtained from the device. For example, in a wired network, such as Ethernet or DSL, a wiremap method is commonplace. In wiremap location determination, the location of a device may be determined by finding which cables are used to send packets to the device. This involves tracing data through aggregation points in the network (e.g., Ethernet switches, DSL access nodes) and finding the port for which packets are sent to the device. This information is combined with data available to the LIS (generally extracted from a database) to determine a final location of the device.

In wireless networks, a range of technologies may be applied for location determination, the most basic of which uses the location of the radio transmitter as an approximation. The Internet Engineering Task Force ("IETF") and other standards forums have defined various architectures and protocols for acquiring location information from an LIS. In such networks, an LIS may be automatically discovered and location information retrieved using network specific protocols. Location information may be retrieved directly or the LIS may generate temporary uniform resource identifiers ("URI") utilized to provide location indirectly (i.e., location URI). Geodetic, civic positions and location URIs for a mobile device may be determined as a function of location information from the LIS. A request for geodetic and/or civic locations may provide location information at the time the location request is made. A location URI may generally be passed to another party which can utilize it to retrieve the target device's location at a later time, typically from the same location server that provided the location URI. There is, however, a need in the art to overcome the limitations of the prior art and provide a novel system and method for managing created location contexts in a location server.

One embodiment of the present subject matter provides a method for creating a location URI for determining the location of a target device. The method may comprise receiving a location request for a target device and collecting location context information for the target device including starting information, validating information and policy information. The collected location context information may be encrypted in an LIS and then converted to a form compatible with URI syntax. A location URI may then be constructed as a function of the converted information.

Another embodiment of the present subject matter may provide a method for handling a location request for a target device using a location URI. The method may comprise receiving a location request for a target device from a requesting entity, the target device having a location context information represented by a location URI and including starting information, initial validating information and policy information. The form of the location URI may be verified by an LIS, the form including at least an encrypted context string. The encrypted context string may be extracted and decrypted by the LIS and it may be determined if the location request can continue as a function of the policy information. An estimated location of the target device may then be determined as a function of the starting information and additional validating information collected. This additional validating information may be correlated with the initial validating information, and the estimated location of the target device provided to the requesting entity.

A further embodiment of the present subject matter provides an LIS comprising circuitry for receiving a location request for a target device, circuitry for collecting location context information for the target device including starting information, validating information and policy information. The LIS may also include circuitry for encrypting the collected location context information, and circuitry for converting the encrypted location context information to a form compatible with URI syntax. The LIS may include circuitry for constructing a location URI as a function of the converted information.

One embodiment of the present subject matter provides an LIS comprising circuitry for receiving a location request for a target device, the target device having a location context information represented by a location URI and including starting information, initial validating information and policy information. The LIS may include circuitry for verifying the form of the location URI, the form including at least an encrypted context string, circuitry for extracting and decrypting the encrypted context string, and circuitry for determining if the location request can continue as a function of the policy information. Further, the LIS may include circuitry for determining an estimated location of the target device as a function of the starting information, circuitry for collecting additional validating information, and circuitry for correlating the additional validating information with the initial validating information. The LIS may also include circuitry for providing the estimated location of the target device to the requesting entity.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

FIGS. 1A-1C are diagrams of Internet location services models.

DETAILED DESCRIPTION

Figure 1C:
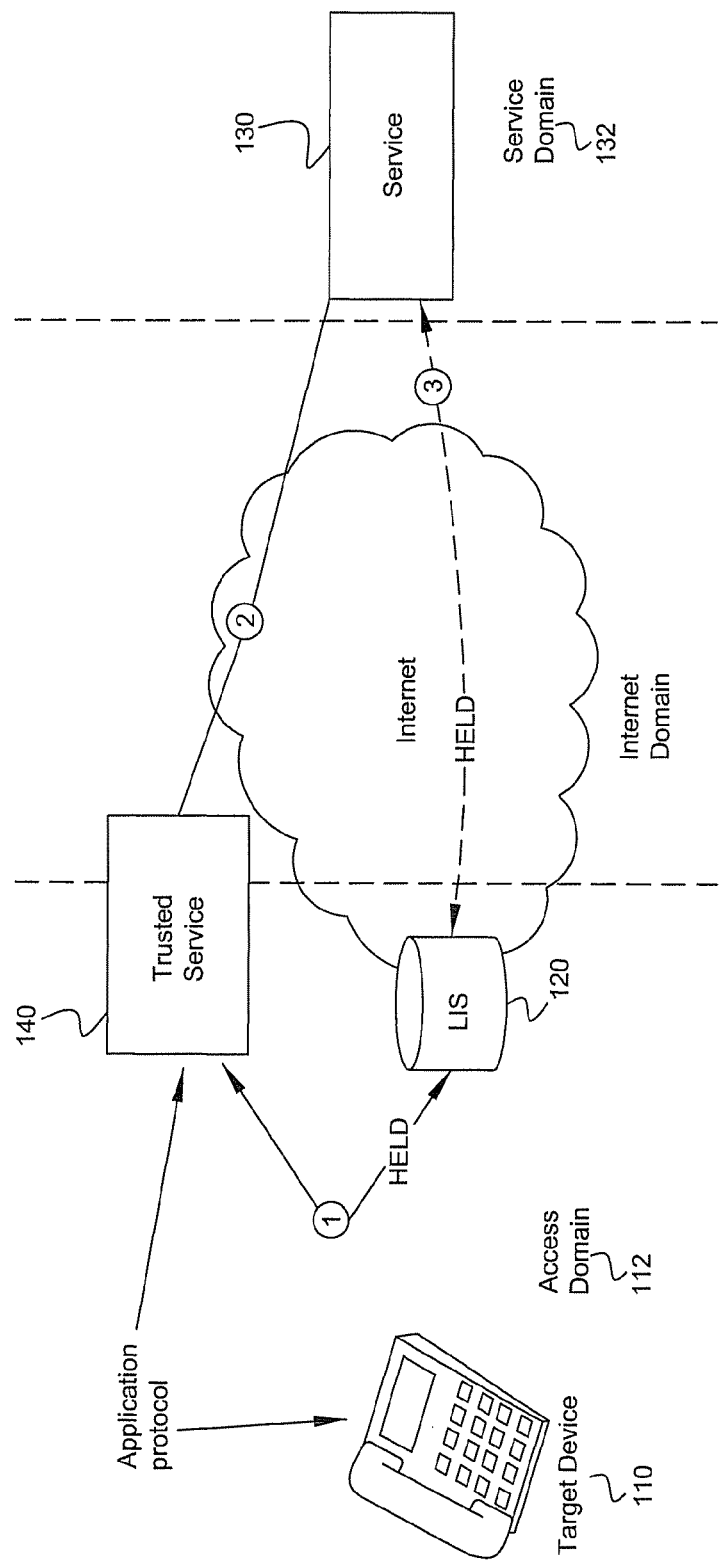

With reference to the figures where like elements have been given like numerical designations to facilitate an understanding of the present subject matter, the various embodiments of a system and method for managing created location contexts in a location server are herein described.

As generally discussed above, the Location Information Server ("LIS") is a network server that provides devices with information about their location. The phrases and respective acronyms of Location Information Server ("LIS") and Location Server ("LS") are used interchangeably throughout this document and such should not limit the scope of the claims appended herewith. Devices that require location information are able to request their location from the LIS. In the architectures developed by the IETF, NENA and other standards forums, the LIS may be made available in an exemplary IP access network connecting one or more target devices to the Internet. In other modes of operation, the LIS may also provide location information to other requesters relating to a target device. To determine location information for a target device, an exemplary LIS may utilize a range of methods. The LIS may use knowledge of network topology, private interfaces to networking devices like routers, switches and base stations, and location determination algorithms. Exemplary algorithms may include known algorithms to determine the location of a mobile device as a function of satellite information, satellite assistance data, various downlink or uplink algorithms such as, but not limited to, time difference of arrival ("TDOA"), time of arrival ("TOA"), angle of arrival ("AOA"), round trip delay ("RTD"), signal strength, advanced forward link trilateration ("AFLT"), enhanced observed time difference ("EOTD"), observed time difference of arrival ("OTDOA"), uplink-TOA and uplink-TDOA, enhanced cell/sector and cell-ID, etc., and hybrid combinations thereof.

A location server according to an embodiment of the present subject matter may utilize a range of inputs to determine location information for the target device. For example, from a request made of the location server, the location server may determine one or more parameters, e.g., Internet Protocol ("IP") and Media Access Control ("MAC") addresses, that uniquely identify the target mobile device. This identification information may be used as an input to an exemplary measurement collection process that produces further information in the form of measurements or measurement results. Measurement information may also be data already known to the location server, additional parameters that identify the target mobile device in other ways, and/or parameters relating to the network attachment of the target mobile device. Non-limiting examples include the MAC address of the device, the identity of network nodes from which network traffic to and from the device transits (including any physical connections involved), the location of network intermediaries (e.g., wiring maps), radio timing, signal strength measurements and other terrestrial radio frequency information, and network configuration parameters, to name a few.

Protocols such as Flexible LIS-ALE Protocol ("FLAP") are being developed in the Alliance for Telecommunications Industry Solutions ("ATIS") forum to provide a formal definition of location-related measurements for different types of access networks. FLAP generally facilitates transfer of values of location measurement parameters from a network to the LIS to enable the latter to compute the location of an IP end-device. The LIS may interact with an Access Location Entity ("ALE") residing in an access network to retrieve location measurements. Location information may be retrieved directly or the LIS may generate temporary uniform resource identifiers ("URI") utilized to provide location indirectly (i.e., location URI). Geodetic, civic positions and location URIs for a mobile device may be determined as a function of location information from the LIS. A request for geodetic and/or civic locations may provide location information at the time the location request is made. A location URI may be passed to another party which can utilize it to retrieve the target device's location at a later time, typically from the same location server that provided the location URI.

There are many models in which an LIS may be utilized. For example, FIGS. 1A-1C provide three examples of Internet location services models for an LIS. With reference to FIG. 1A, a location by value model is provided in which a target device 110 may obtain a location from a location server 120 in a respective access network or domain 112. The device 110 may then convey its location to a location based service 130 in the service domain 132 using an appropriate application protocol. With reference to FIG. 1B, a location by reference model is provided in which a mobile device 110 may obtain a reference from the location server 120 in the respective access network or domain 112. The device 110 may convey the reference to the location based service 130 in the service domain using an appropriate application protocol. The service 130 may then query the location server 120 direct for location values for the device 110. Generally the protocol utilized for communication between the device 110 and location server 120 is HTTP Enabled Location Delivery ("HELD") and the protocol utilized for communication between the location server 120 and the service 130 is HELD. The protocol utilized for communication between the device 110 and the service 130 is application protocol dependent.

With reference to FIG. 1C, an on-behalf-of ("OBO") location model is provided in which a trusted third party application or service 140 queries for the location of a device 110. A client identity, which is understood by the location server 120, may be used as a query parameter (e.g., IP or MAC address). If applicable, the third party 140 may provide location information to external service entities 130. If the location was requested and provided by reference, the external entity 130 may query back to the location server 120 for location value updates using the HELD protocol. The above described Internet location services models illustrate how LIS clients may request and receive location information from the LIS. The value of parameters derived from such a communications network may be used by the device and may be used by the LIS to determine location. In order to make use of these parameters, it is necessary for their values to be transferred form the communication network elements to the LIS, which is one purpose of FLAP.

Figure 2:
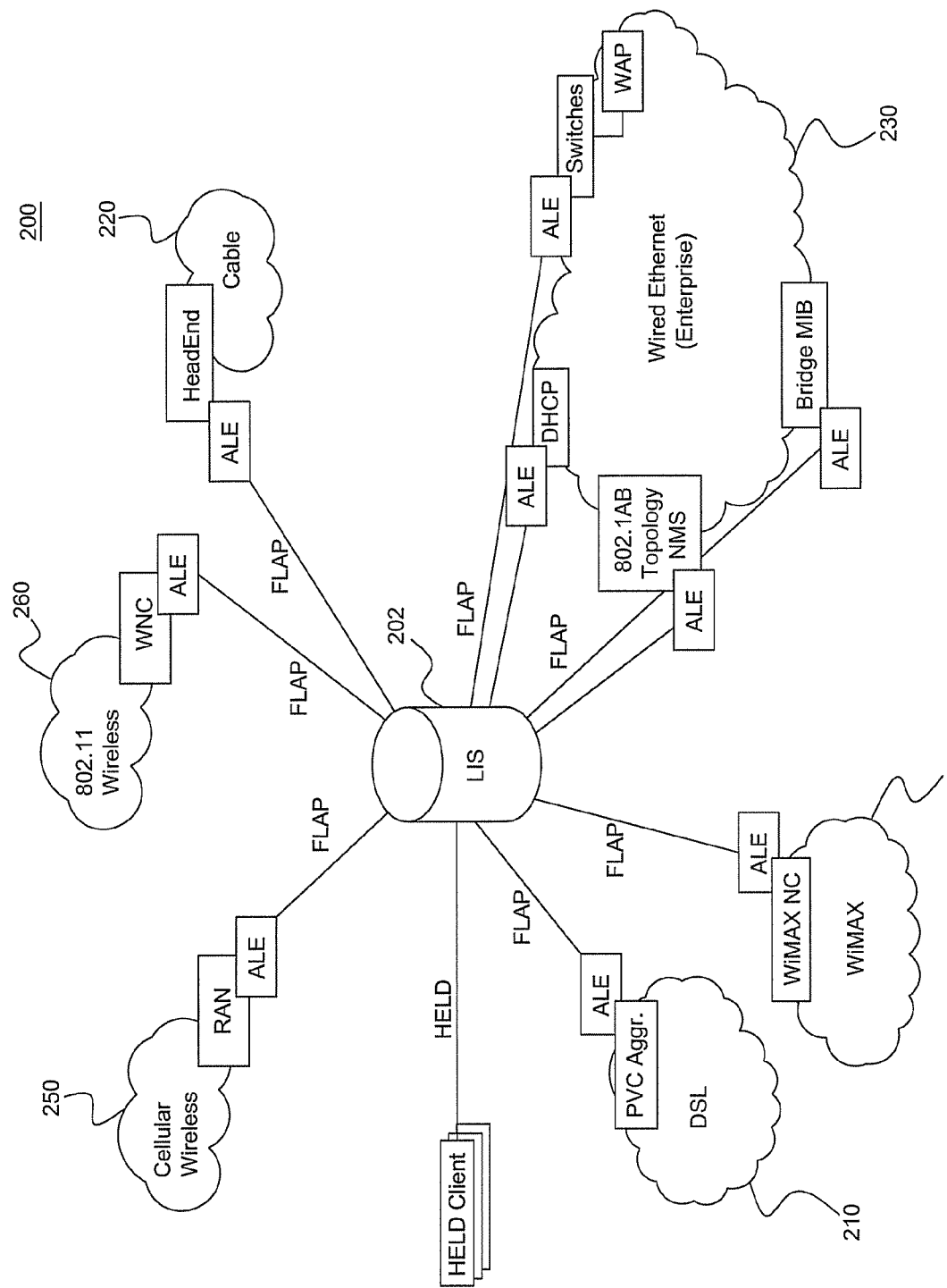
FIG. 2 is a diagram of an exemplary access network model.

FIG. 2 is a diagram of an exemplary access network model. With reference to FIG. 2, an exemplary access network model 200 may include one or more LISs 202 connected to one or more access networks, 210-260. An access network refers to a network that provides a connection between a device and the Internet. This may include the physical infrastructure, cabling, radio transmitters, switching and routing nodes and servers. The access network may also cover services required to enable IP communication including servers that provide addressing and configuration information such as DHCP and DNS servers. Examples of different types of access networks include, but are not limited to, DSL 210, cable 220, WiFi, wired Ethernet 230, WiMAX 240, cellular packet services 250, and 802.11 wireless 260, among others.

Figure 3:
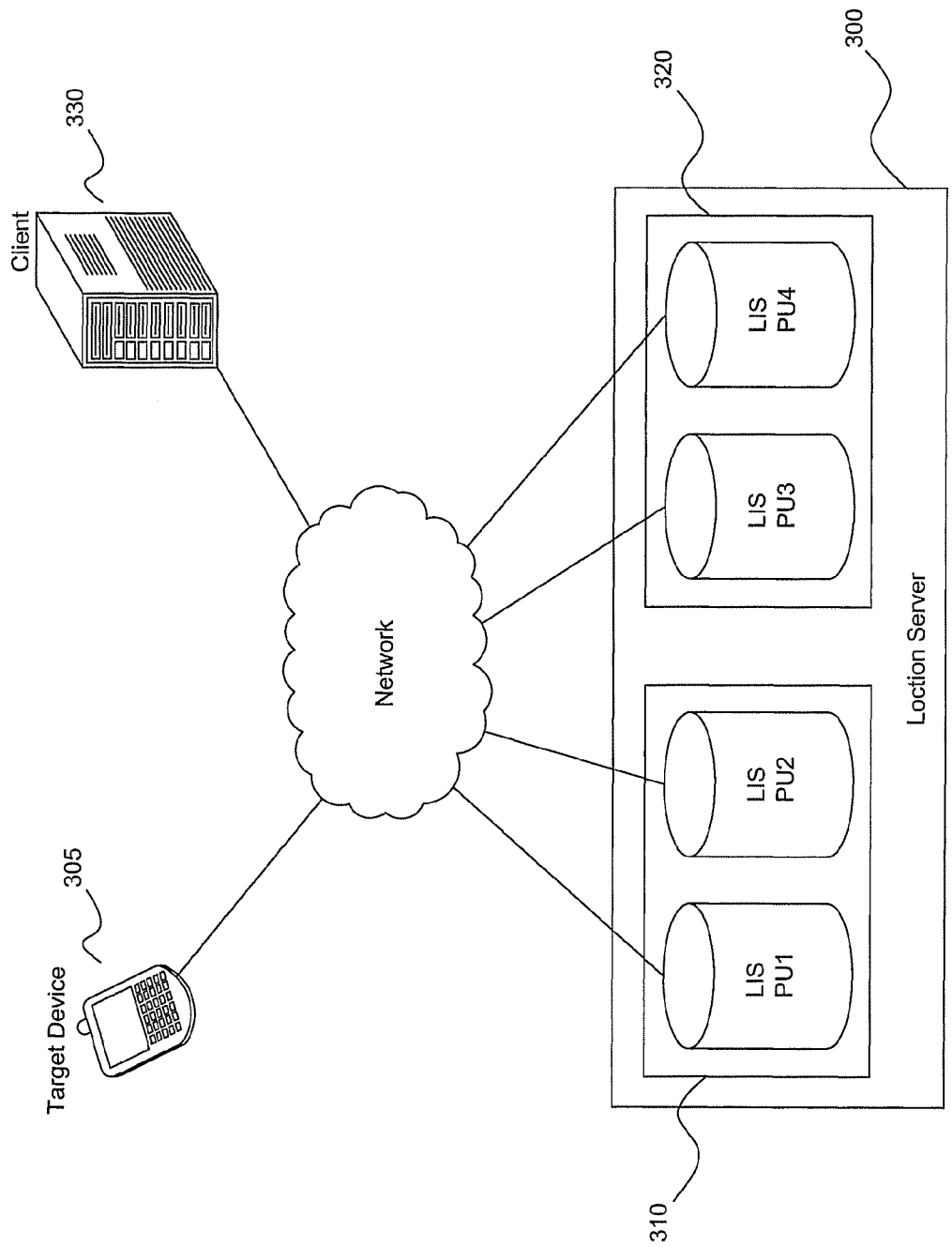
FIG. 3 is a diagram of a location server according to one embodiment of the present subject matter.

FIG. 3 is a diagram of a location server according to one embodiment of the present subject matter. With reference to FIG. 3, in some application domains, such as emergency services, location servers should be available at all times. To ensure this, an exemplary location server 300 may be implemented on multiple processing units, PU1, PU2, PU3, PU4, any one of which may provide location information for a target device 305 from a first site 310, a second site 320 and/or additional sites (not shown). In one embodiment, an exemplary location server 300 may provide high availability by having more than one PU at a first site 310 and by having multiple PUs at the second site 320 for copying or backup purposes in the event a site or PU fails. In a location URI context, one embodiment of the present subject matter may include a client system 330 that utilizes a location URI passed by the target device 305 to acquire the location of the target device 305. Of course, these examples are only a few of the many possible configurations of redundant PUs that could be employed utilizing embodiments of the present subject matter and such examples are not intended to limit the scope of the claims appended herewith.

For a location URI to be utilized in providing a target device's location, a location context for the device should be established. In one embodiment, this location context may comprise starting details, validating details, and policy details. Starting details may be any information required to initiate a location determination for the target device, e.g., IP address, MAC address, etc. Validating details may be any information used to ensure the starting details still apply to the same target device. Validating details are generally needed because some of the starting details may become invalid, and over time, may refer to a different device. Some level of confidence may generally be required to ensure that the starting details continue to refer to the same target device. Exemplary validating details in an enterprise network may be, but are not limited to, the MAC address of the target device, assuming this information is available to the location server. Policy details may be any information indicating whether a location is allowed to be provided, including but not limited to, a location context expiry time (e.g., after this time, the location context cannot be used), etc.

Conventionally, location context information is shared among the processing units within a location server using a back channel, such as a shared database, or using inter-processing unit network communication. However, such prior art mechanisms may be too complex to implement, may be fragile, and/or may have difficulty to manage failure modes such as race conditions. Furthermore, these deficiencies are magnified in geographically redundant configurations. Embodiments of the present subject matter, however, embed and utilize location context information directly in the location URI, thus avoiding the back channel issues prevalent in the conventional art.

Figure 4:
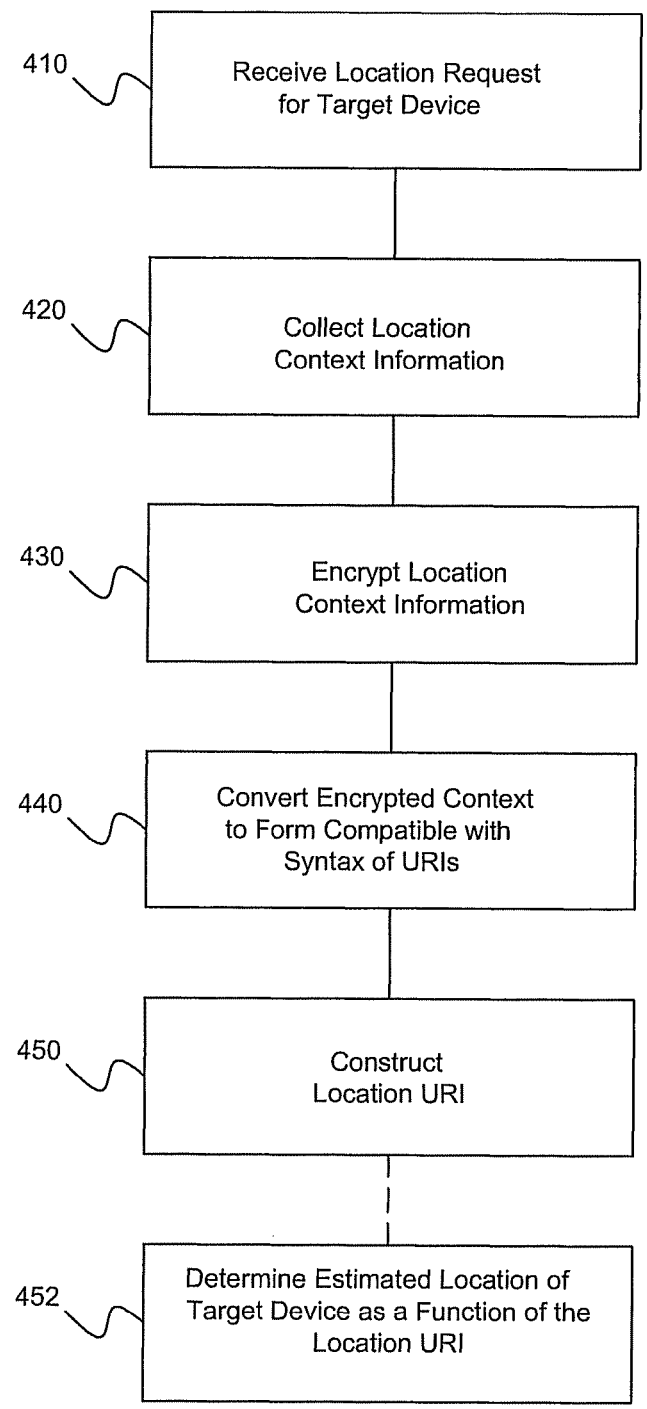
FIG. 4 is an algorithm according to an embodiment of the present subject matter.

FIG. 4 is an algorithm according to an embodiment of the present subject matter. With reference to FIG. 4, a method 400 for creating a location URI with embedded target device location context information is provided. At step 410, a location request may be received for a target device. An exemplary target device may be, but is not limited to, a cellular device, text messaging device, computer, portable computer, vehicle locating device, vehicle security device, communication device, or wireless transceiver. The location request may be in a geodetic location form, a civic location form or a location URI form. In one embodiment, the target device may request that its location be returned as a location URI from an exemplary location server, such as, but not limited to, an LIS. The LIS may, as discussed above, comprise one or more processing units at one or more processing sites. The location server may then collect the location context information, e.g., starting, validating and policy details, at step 420 and, in one embodiment, may include some of the steps required to provide a geodetic or civic location, e.g., determining the target device's MAC address or IP address. The starting details may include information for initiating a location determination for the target device, the validating details may include information correlating the starting details with the target device, and the policy details may include indicating whether a location of the target device may be provided to a requesting entity.

At step 430, the information in the location context may then be encrypted. This encryption may be conducted utilizing a method and encryption key known to any one or all processing units in the location server. At step 440, the encrypted context may then be converted to a form compatible with the syntax of URIs, e.g., hexadecimal string, etc. In certain embodiments, it may be necessary to compress the location context before the encryption process to keep a resulting location URI at a reasonable length. At step 450, the location URI may be constructed and may include the host address of the location server, other URI details (e.g., addressing information within the host based on protocol, routing and network details, etc.), and the encrypted context string. The location URI may also include a uniform resource name ("URN"), a uniform resource location ("URL"), and combinations thereof. For example, a non-limiting constructed URI may take the form of:

https://lis.example.com/somepath?c=encrypted-context-string

It should be noted that the lis.example.com above may represent a host name resolving to any one or combination of processing units in an exemplary location server. It may also be implemented utilizing a variety of mechanisms, including, but not limited to, directly using DNS, using a global server load balancing device, etc. In another embodiment, at step 452, an estimated location of the target device may be determined as a function of the constructed location URI, and the constructed location URI provided to a requesting entity. Of course, this requesting entity may be the target device or a third party such as a location client system. It should be noted that since the location URI also contains the location context information, no back channel between location server processing units is required. Any number of the steps described above and shown in FIG. 4 may be implemented in the location servers (e.g., LISs) depicted in FIGS. 1-3.

Figure 5:
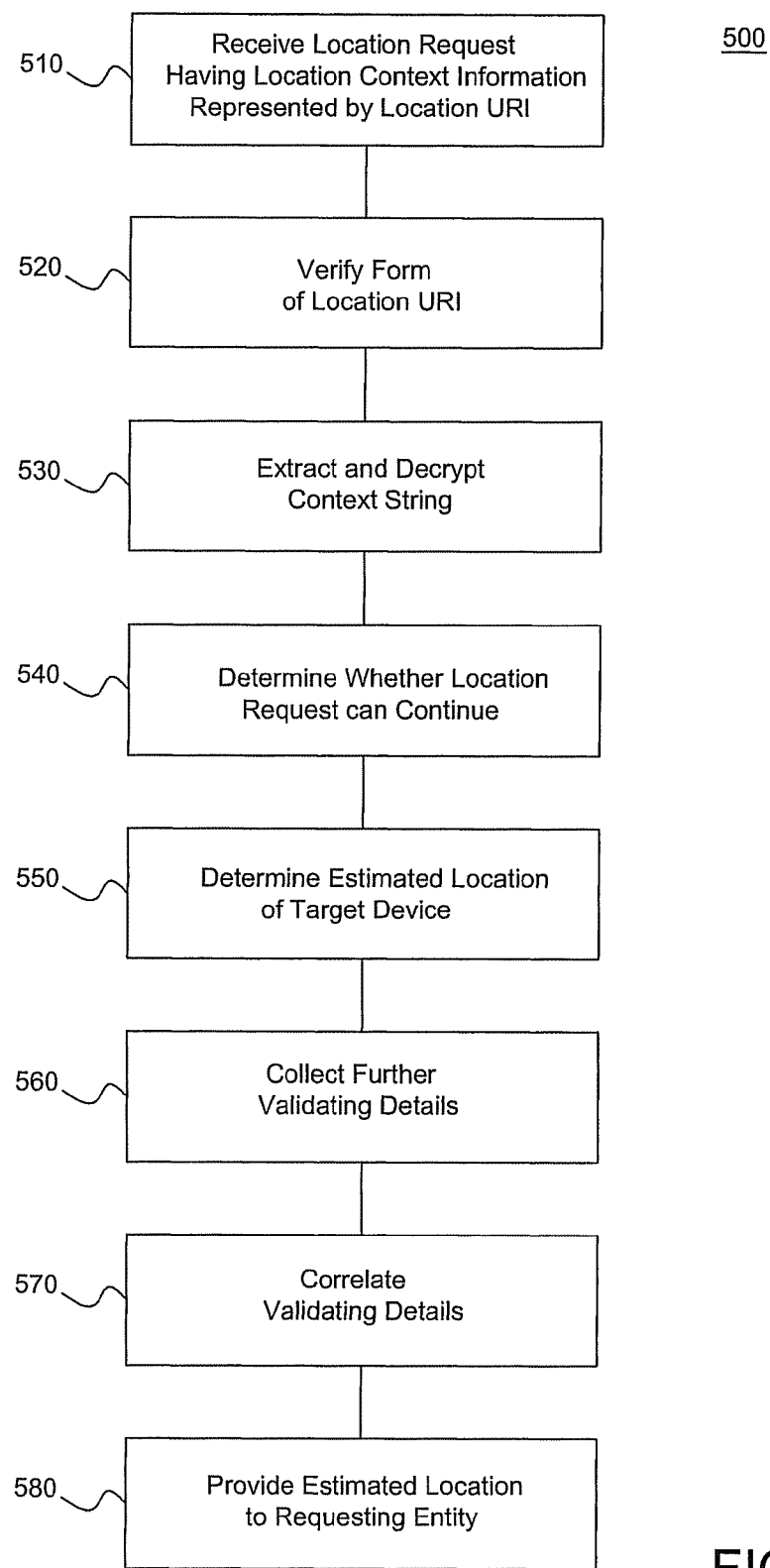
FIG. 5 is an algorithm according to another embodiment of the present subject matter.

FIG. 5 is an algorithm according to another embodiment of the present subject matter. With reference to FIG. 5, a method 500 for handling a location client request using a location URI containing embedded context is provided. At step 510, a location request may be received at a location server for a target device. In one embodiment, a location client may request the location server provide the civic or geodetic location of the target device having a context is represented by the location URI. This location URI may include starting details, validating details, and policy details and may also include a URN, URL, and combinations thereof. Exemplary starting details may be information for initiating a location determination for the target device, exemplary validating details may be information correlating the starting information with the target device, and exemplary policy details may be information indicating whether a location of the target device may be provided to the requesting entity. An exemplary target device may be, but is not limited to, a cellular device, text messaging device, computer, portable computer, vehicle locating device, vehicle security device, communication device, or wireless transceiver. The location request may be in a geodetic location form, a civic location form or a location URI form. In one embodiment, the target device may request that its location be returned as a location URI from an exemplary location server, such as, but not limited to, an LIS. The LIS may, as discussed above, comprise one or more processing units at one or more processing sites. At step 520, the form of the location URI may be verified by the location server, and this form may include an encrypted context string, a host address of the location server and/or addressing information based on protocol, routing, and network details.

At step 530, the location server may then extract and decrypt the encrypted context string. In one embodiment, the context string may be decrypted using shared knowledge among any number or combination of location server processing units that identify the necessary encryption algorithm and keys. At step 540, it may be determined whether the location request can continue as a function of the policy information. For example, if the expiry time in the reconstructed location context has passed, then an error may be returned to the location client and the process terminated. At step 550, given the reconstructed location context information, the location server may determine an estimated location of the target device as a function of the starting details. During this process, at step 560, additional validating details may also be collected. These additional validating details may be correlated or checked for consistency with the validating details in the target device's location context at step 570. In the instance where this check fails or is inconsistent, then an error may be returned to the location client instead of a location. In one embodiment, this consistency check may occur as information is collected, rather than after a location is determined; further, additional information beyond that needed to determine location may also be collected. At step 580, an estimated location of the target device may be returned or provided to the requesting entity. Of course, this requesting entity may be the target device or a location client system to enable the system to locate the device. Any number of the steps described above and shown in FIG. 5 may be implemented in the location servers (e.g., LISs) depicted in FIGS. 1-3.

It is thus an aspect of embodiments of the present subject matter to provide a system and method for creating and using location contexts embedded directly in a location URI suitable for use by a highly available location server for implicitly created location contexts.

As shown by the various configurations and embodiments illustrated in FIGS. 1-5, a system and method for managing created location contexts in a location server have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for handling a location request for a target device using a location uniform resource identifier ("URI"), comprising the steps of:
    (a) receiving a location request for a target device from a requesting entity, the target device having a location context information represented by a location URI with embedded starting information, initial validating information and policy information;
    (b) verifying the form of the location URI by a location information server ("LIS"), the form including at least an encrypted context string;
    (c) extracting and decrypting the encrypted context string by the LIS;
    (d) determining if the location request can continue as a function of the policy information;
    (e) determining an estimated location of the target device as a function of the starting information;
    (f) collecting additional validating information;
    (g) correlating the additional validating information with the initial validating information; and
    (h) providing the estimated location of the target device to the requesting entity.

2. The method of claim 1 wherein the form of the location URI further includes a host address of the LIS and addressing information based on protocol, routing, and network details.

3. The method of claim 1 wherein the LIS comprises one or more processing units at one or more processing sites.

4. The method of claim 3 wherein the step of extracting and decrypting further comprises using shared knowledge between the one or more processing units at one or more processing sites.

5. The method of claim 1 further comprising the step of returning an error to the requesting entity if the additional validating information fails to correlate with the initial validating information.

6. The method of claim 1 wherein the requesting entity is the target device or a location client.

7. The method of claim 1 wherein the location URI includes a uniform resource name ("URN"), a uniform resource location ("URL"), and combinations thereof.

8. The method of claim 1 wherein the starting information includes information for initiating a location determination for the target device.

9. The method of claim 1 wherein the initial and additional validating information includes information correlating the starting information with the target device.

10. The method of claim 1 wherein the policy information includes information indicating whether a location of the target device may be provided to the requesting entity.

11. The method of claim 1 wherein the location request is for a geodetic location or a civic location of the target device.

12. The method of claim 1 wherein the target device is selected from the group consisting of: cellular device, text messaging device, computer, portable computer, vehicle locating device, vehicle security device, communication device, and wireless transceiver.

13. A location information server ("LIS") comprising:
    (a) circuitry for receiving a location request for a target device, the target device having a location context information represented by a location URI with embedded starting information, initial validating information and policy information;
    (b) circuitry for verifying the form of the location URI, the form including at least an encrypted context string;
    (c) circuitry for extracting and decrypting the encrypted context string;

(d) circuitry for determining if the location request can continue as a function of the policy information;
(e) circuitry for determining an estimated location of the target device as a function of the starting information;
(f) circuitry for collecting additional validating information;
(g) circuitry for correlating the additional validating information with the initial validating information; and
(h) circuitry for providing the estimated location of the target device to the requesting entity.

14. The LIS of claim 13 wherein the form of the location URI further includes a host address of the LIS and addressing information based on protocol, routing, and network details.

15. The LIS of claim 13 wherein the LIS comprises one or more processing units at one or more processing sites.

16. The LIS of claim 15 wherein the LIS is adaptable to use shared knowledge between the one or more processing units at one or more processing sites.

17. The LIS of claim 13 wherein the requesting entity is the target device or a location client.

18. The LIS of claim 13 wherein the location URI includes a uniform resource name ("URN"), a uniform resource location ("URL"), and combinations thereof.

19. The LIS of claim 13 wherein the starting information includes information for initiating a location determination for the target device.

20. The LIS of claim 13 wherein the initial and additional validating information includes information correlating the starting information with the target device.

21. The LIS of claim 13 wherein the policy information includes information indicating whether a location of the target device may be provided to the requesting entity.

22. The LIS of claim 13 wherein the location request is for a geodetic location or a civic location of the target device.

23. The LIS of claim 13 wherein the target device is selected from the group consisting of: cellular device, text messaging device, computer, portable computer, vehicle locating device, vehicle security device, communication device, and wireless transceiver.

24. In a location information server ("LIS") that has received a location request for a target device, the target device having location context information represented by a location uniform resource identifier ("URI"), a method for handling the location request for the target device using a location URI, comprising the steps of:
(a) verifying the form of the location URI by the LIS, wherein the location context information is embedded within the URI and includes starting information, initial validating information and policy information;
(b) if the location request can continue as determined by the policy information, then determining an estimated location of the target device as a function of the starting information;
(c) collecting additional validating information and correlating the additional validating information with the initial validating information; and
(d) providing the estimated location of the target device to a requesting entity.

* * * * *